Jan. 18, 1966   F. KERZE, JR   3,230,152
COMPARTMENTED NUCLEAR REACTOR FUEL ROD AND METHOD OF MAKING
Filed April 13, 1964

INVENTOR.
Frank Kerze, Jr.
BY
ATTORNEY.

United States Patent Office 3,230,152
Patented Jan. 18, 1966

3,230,152
COMPARTMENTED NUCLEAR REACTOR FUEL ROD AND METHOD OF MAKING
Frank Kerze, Jr., Bethesda, Md., assignor to the United States of America as represented by the United States Atomic Energy Commission
Filed Apr. 13, 1964, Ser. No. 359,533
8 Claims. (Cl. 176—76)

The present invention relates to fuel elements for heterogeneous nuclear reactors and more particularly to a fuel rod adaptable for use in pressurized or boiling water reactors.

In heterogeneous power reactors a fissionable material and a coolant are arranged separately and discretely, generally in symmetric arrays to form a core within which a nuclear chain reaction can take place. The fissionable material or fuel is usually contained within fuel plates or fuel rods. These plates or rods are assembled at fixed spacings into groups or bundles known as fuel elements. The reactor coolant flows over the plates or rods to remove the heat generated therein by fission. The fuel material is either uranium or plutonium metal, an alloy of these metals, or an oxide or carbide of these metals.

A common practice in making fuel rods for power reactors is to form a fissionable material such as uranium dioxide into small right circular cylinders called pellets. These pellets are inserted into a long metallic tube which has an interior diameter slightly greater than the outer diameter of the pellets. The metal of the tube is generally zirconium or stainless steel. The tube is sealed at both its ends when sufficiently filled with a column of fuel pellets. However, one disadvantage of fuel rods assembled in this manner is that in the event of tube rupture the entire contents of the tube are subject either to (1) a reaction with the coolant such as a uranium-water reaction resulting in dispersion of the reactants throughout the primary coolant, or to (2) dispersion of the fuel alone as in the case of uranium-dioxide fuel. Compartmentation would limit dispersion and fuel-coolant reactions.

A second disadvantage is that individual pellets are not locked in position, and are not positioned relative to the tube or relative to adjacent pellets. Thus, vertical movement of the fuel pellet column can take place either during installation and assembly of the fuel rod or during power operation in a reactor core when the pellets are subjected to thermal expansion due to the high operating temperatures. After vertical movement has taken place, the pellets do not always return to their original positions because of pellet-tube wall seizure as a pellet expands to the tube wall upon heating or chips or debris will have become wedged between the pellet and tube wall. Therefore, a ratchetting effect can take place in the fuel pellet column which can lead to undesirable fuel rod distortion upon thermal cycling.

A third disadvantage is that essentially all heat generated by fissions within a pellet is transferred radially outward through the pellet. Compartmentation provides a metallic heat flow path from the pellet ends for an improvement in overall heat transfer.

Accordingly, one object of this invention is to prevent the ratchetting effect in fuel pellet columns by providing a novel form of a fuel rod in which the pellets are held in individual compartments thus retarding or limiting fuel-coolant reactions.

Another object of the invention is to achieve accurate compartment spacer placement and, hence, accurate and stable placement of the fuel pellets.

Still another object is to improve the transfer of heat from the fuel to the tube.

A further object of the invention is to minimize dimensional or metallurgical changes in the fuel tube during assembly.

These and other objects, features and advantages of the invention will be elaborated upon in the forthcoming description of the invention.

My invention comprises using dished spacing disks which are wedged into position immediately following and behind each of the fuel pellets as they are inserted into a cladding tube to form a fuel rod.

Referring to the drawings.

Figure 1:
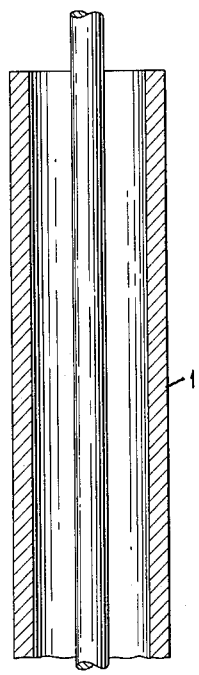
FIGURE 1 is a cross-sectional view of a partially filled fuel rod showing the longitudinal section, a spacing disk immediately before being wedged into position, and the cylindrical rod used for wedging the disks into position.
Figure 2:
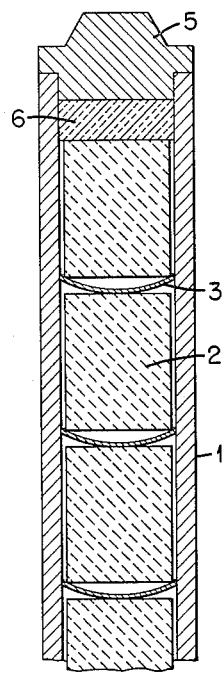
FIGURE 2 is a cross-sectional view of a filled fuel rod showing the longitudinal section.

Referring now in particular to FIGURE 1 of the drawings, an elongated tube 1 comprises the cladding jacket for the fuel rod. In a preferred embodiment this tube would be composed of the metal zirconium or one of its alloys. Typical dimensions of the tube 1 would be an overall diameter of 0.3125 inch, a wall thickness of 0.020 inch, an inner diameter of 0.2725 inch, and a length of 24 inches. The cladding tube 1 as shown is sealed at end by end plug 5 welded to the tube. Immediately above end plug 5 is an insulating pellet 6 which is constructed of an inert material of low heat transfer capabilities. A fuel pellet 2 rests on the insulating pellet 6. The fuel pellets are typically constructed of uranium-dioxide, are short right circular cylinders, and, in keeping with the above mentioned dimensions, have a diameter of 0.2675 inch and a height of 0.375 inch. Continuing up the column, spacing disk 3 is shown wedged into position. Above disk 3 is another fuel pellet 2 followed by disk 3 in an unflattened condition. Plunger 7 is shown in position to flatten dished disk 3. The pattern of loading as above described is repeated until the cladding tube 1 is filled by a column of spacing disks and fuel pellets. Once filled, an insulating plug 6 and end plug 5 are used to seal, in the manner hereinabove described, the end of the cladding tube 1 which had remained open. A fully loaded and sealed compartmented fuel rod is shown in FIGURE 2.

Figure 3:
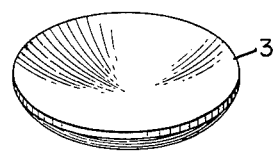
FIGURE 3 is an enlarged perspective view of one of the dished spacing disks.
Figure 4:
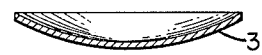
FIGURE 4 is a cross-sectional view of a dished spacing disk.
Figure 5:
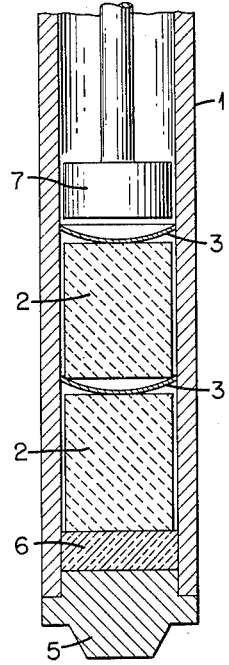
FIGURE 5 is an enlarged perspective view of one of the dished spacing washers.
Figure 5:
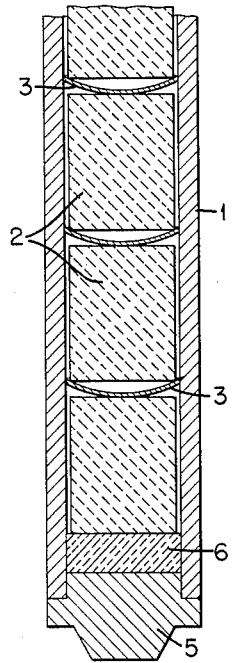
Figure 5:
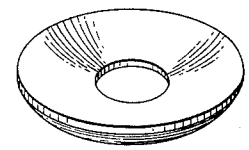

The shape of the dished disks will generally conform to a spherical surface of appropriate radius to fit the inner diameter of the cladding tube. Usually, the spherical radius will be greater than half the tube's inner diameter as the wedging action for a hemispherical disk would not be satisfactory. However, the invention is not limited to disks whose contours conform to spherical surfaces since parabolic, hyperbolic, or other surfaces can be used. Also, as can be seen in FIGS. 3, 4 and 5, the preferred disk shape has a near-cylindrical edge. This can be obtained by using a rounded punch to attain dishing before the actual shearing action occurs.

Consistent with the dimensions used herein, the dished spacing disk 3 would have a planar diameter of 0.2725 inch when wedged into position and would be made of zirconium metal. Plunger 7 would have a diameter of 0.2675 inch across the portion of its head used to wedge the dished disks 3. The disks are all inserted convex side downwards. As the plunger 7 is advanced onto disk 3 and forces it to begin flattening, the periphery of disk 3 comes into contact with the interior wall of tube 1. As the disk 3 is further forcibly flattened, its trailing edge diameter tends to increase faster than the leading edge. It is this trailing edge that actually contacts the interior tube wall first, and here the severest galling or cold-welding occurs between disk 3 and cladding tube 1. This effect is noted in the preferred embodiment as well as with stainless steel. In the preferred embodiment the usually undesirable properties of zirconium, such as galling and seizing, are made use of in wedging the spacing disk 3 in position. Once the disk 3 is wedged into position, the pellet compression holds the disk in place, there being no springback bulge in the disk.

An alternate method of loading and wedging the disks into place is to use a ram with a preset loading to drive plunger 7. Such a ram could have set positions according to the particular dimension of the pellet, disk, and tube in order to effect automatic loading.

FIGURE 5 shows a dished spacing washer 8 which would be used and installed in a compartmented fuel element as described above for the dished spacing disk. The washer 8 is simply the disk 3 modified by having a small hole punched in its center. Consistent with the above dimensions the diameter of the hole would be 0.0625 inch. The use of the washer 8 as a spacer is particularly advantageous in those nuclear reactor applications where a high fuel burnup is desired. In these instances the release of fission gases will be large and the washer permits compartment-to-compartment escape of the gases so that they can be collected in a void space which, for this reactor application, would be left at the upper end of cladding tube 1, between the insulating plug 6 and end cap 5 that are shown in FIGURE 2.

My invention is not limited to the specific modifications which have been described above, but includes equivalents and obvious modifications.

What is claimed is:

1. In a nuclear reactor fuel rod having an elongated tubular jacket containing a plurality of fuel pellets, the improvement comprising dished spacing disks whose peripheries are in wedged contact with the interior wall of said tubular jacket adjacent to said fuel pellets and forming longitudinal compartments for said pellets.

2. The fuel element according to claim 1, wherein the dished spacing disks are annular.

3. In a nuclear reactor fuel element having an elongated tubular jacket containing a column of fuel pellets, the improvement comprising dished spacing disks in compessive contact with said fuel pellets and in wedged peripheral contact with the interior walls of the aforementioned tubular jacket forming longitudinal compartments for said pellets.

4. In a nuclear reactor fuel element having a elongated tubular metallic jacket containing a column of fuel pellets, the improvement comprising dished metallic spacing disks in compressive contact with said fuel pellets and in peripheral cold welded bond with the aforementioned tubular metallic jacket forming longitudinal compartments for said fuel pellets.

5. The fuel element according to claim 4, wherein the metal for both the tubular jacket and the dished disk is zirconium.

6. The fuel element according to claim 4, wherein the metal for both the tubular jacket and the dished disk is a zirconium base alloy.

7. The fuel element according to claim 4, wherein both the tubular jacket and dished spacing disk are stainless steel.

8. A method for making a nuclear reactor fuel element which comprises the steps of (a) sealing one end of a tubular jackets, (b) inserting a fuel pellet therein, (c) inserting a dished circular spacer disk with its convex side adjacent to said fuel pellet, (d) pressing the dished disk against the fuel pellet into a wedged position with the interior tube walls, (e) repeating steps (b), (c), and (d) until the tube is filled, (f) and sealing the end of the tubular jacket which remains open.

References Cited by the Examiner

UNITED STATES PATENTS

| | | | |
|---|---|---|---|
| 3,009,869 | 11/1961 | Bassett | 176—76 X |
| 3,053,743 | 9/1962 | Cain | 176—76 X |
| 3,089,830 | 5/1963 | McGeary et al | 29—474.4 X |
| 3,125,493 | 3/1964 | D'Amore | 176—76 |

LEON D. ROSDOL, *Primary Examiner.*

L. DEWAYNE RUTLEDGE, REUBEN EPSTEIN,
*Examiners.*

R. L. GRUDZIECKI, *Assistant Examiner.*